No. 684,470. Patented Oct. 15, 1901.
G. H. SPRINKLE.
WHEEL HUB.
(Application filed June 26, 1901.)
(No Model.) 2 Sheets—Sheet 1.

Witnesses
Harry L. Ames.
H. Schmidt.

Inventor
George H. Sprinkle.
By Victor J. Evans
Attorney

No. 684,470. Patented Oct. 15, 1901.
G. H. SPRINKLE.
WHEEL HUB.
(Application filed June 26, 1901.)
(No Model.)
2 Sheets—Sheet 2.
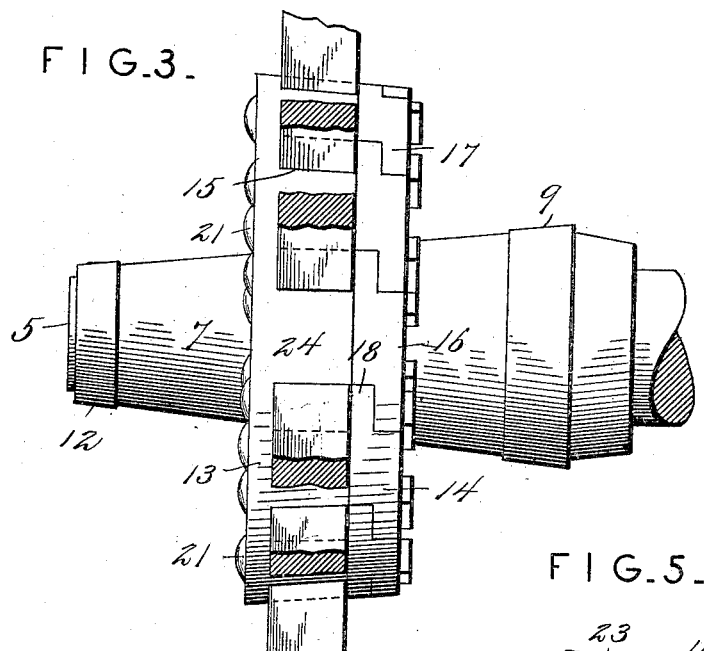
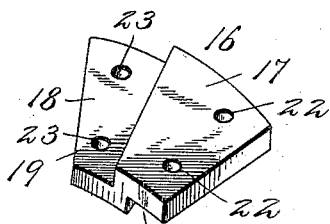
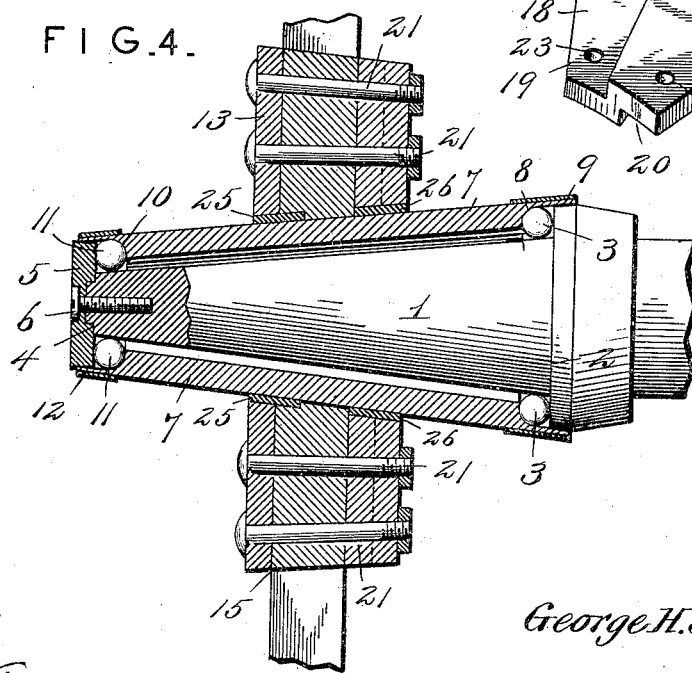
Witnesses
Harry L. Amer,
H. Schmidt.
Inventor
George H. Sprinkle
By Victor J. Evans
Attorney

UNITED STATES PATENT OFFICE.

GEORGE H. SPRINKLE, OF PENNINGTON GAP, VIRGINIA, ASSIGNOR OF ONE-HALF TO ABRAHAM Z. YEARY, EDMUND F. HOLDEN, AND GEORGE W. GISH, OF SAME PLACE.

WHEEL-HUB.

SPECIFICATION forming part of Letters Patent No. 684,470, dated October 15, 1901.

Application filed June 26, 1901. Serial No. 66,135. (No model.)

*To all whom it may concern:*

Be it known that I, GEORGE H. SPRINKLE, a citizen of the United States, residing at Pennington Gap, in the county of Lee and State of Virginia, have invented new and useful Improvements in Wheel-Hubs, of which the following is a specification.

This invention relates to wheel-hubs; and the principal object of the invention is to provide a hub of simple construction which will admit of a portion of one of the sides or sections of the hub being removed in case it becomes necessary to place a new spoke in the wheel of which the hub forms a part.

At the same time the invention has for its object to provide a simple, strong, and durable construction of hub, the parts being so combined and arranged that while admitting of the removal of an old spoke and the introduction of a new one the strength of the hub will not be impaired.

With the above and other objects in view the invention consists in the novel construction, combination, and arrangement of parts hereinafter fully described, illustrated, and claimed.

Figure 1:
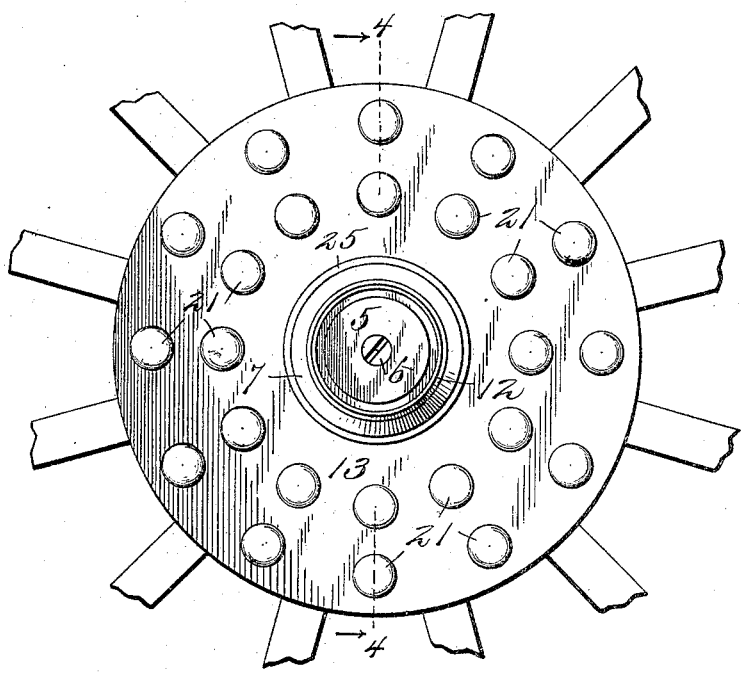
Figure 2:
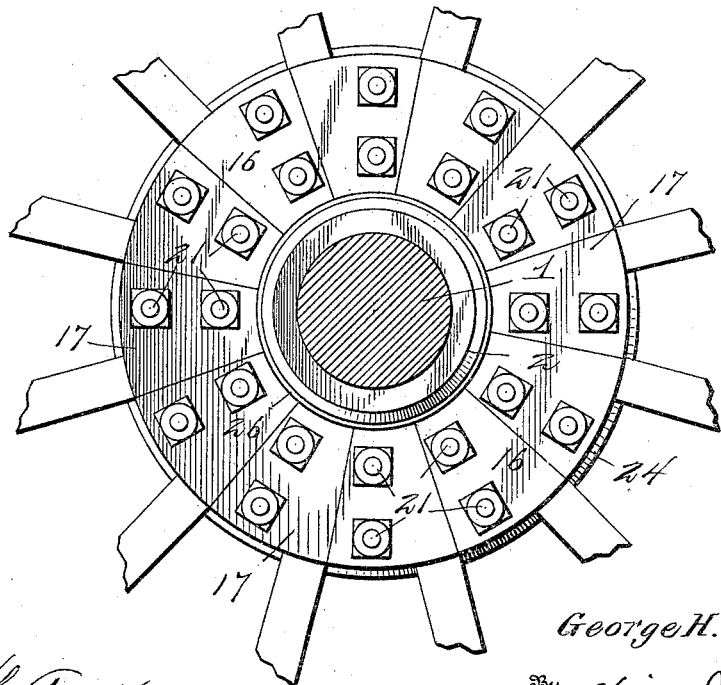

In the drawings, Figure 1 is a side elevation of a wheel-hub constructed in accordance with this invention looking toward the outer side. Fig. 2 is also an elevation of the hub looking toward the inner side and showing the spindle in section. Fig. 3 is a plan view of the hub with the spokes partially broken away. Fig. 4 is a diametrical section through the hub, showing the axle-spindle in elevation. Fig. 5 is a detail perspective view of one of the segments.

Like numerals of reference designate like parts in all the views.

In the drawings, 1 designates the axle-spindle, provided at its inner end with the usual enlargement, which provides a shoulder 2, against which runs a circular series of antifriction-balls 3. The outer end of the spindle is reduced and shouldered, as illustrated at 4, to receive a disk-shaped end cap 5, which is rabbeted to fit over the reduced extremity of the spindle, as illustrated in Fig. 4, and provided with a central opening for the reception of a retaining device 6, preferably in the form of a screw, the shank of which is inserted in a threaded socket in the end of the spindle, as shown. The hub proper consists of a tapering sleeve 7, provided at its inner end with a ball-race 8, in which the antifriction-balls 3 run, the said inner end of the hub being provided with a sand band or collar 9. The outer end of the hub is also provided with an internal ball-race 10, in which travel a circular series of antifriction-balls 11, said balls also bearing against the inner surface of the end cap or disk 5. The outer end of the hub is encircled by a strap or collar 12. The balls 3 and 11 serve in addition to their function of carrying the weight of the vehicle and load to take the end thrust of the axle.

The main feature of the invention resides in the construction of the spoke-receiving portion of the hub, and in carrying out the invention the said portion of the hub consists of a stationary section or side 13 and a removable side or section 14. The stationary side or section 13 is provided upon its inner side with a series of spoke-receiving mortises 15, in which the inner tapered ends of the spokes are received, as illustrated in Figs. 3 and 4, the spokes being of the ordinary shape. The remaining side or section 14, which is preferably the inner side of the hub, is composed of a circular series of segments, each of the form illustrated in Fig. 5 and designated by the numeral 16. Each segment is shaped to comprise two end portions, which are located in different planes, being offset from each other to form an outer plate 17 and an inner plate 18. In offsetting the outer and inner plates in the manner shown in Fig. 5 recesses or depressions 19 and 20 are formed, in which the overlapping and projecting edges of the upper and lower plates of adjoining and abutting segments are received, as illustrated in Fig. 3. In this way a complete inner side or section is made up for the hub, and the several segments 16 are securely bolted together and to the stationary or fixed side or section of the hub by means of bolts 21, which pass through openings 22 in the outer plate of one segment, thence inward through openings 23 in the inner plate of the adjoining or abutting segment, and also through the webs 24 on the stationary section, which form the solid part of said section between the spoke-receiving mortises, as will be readily understood by an examination of Fig. 3.

25 and 26 designate bands which encircle the sleeve 7 and assist in securing the fixed and sectional sides of the spoke-engaging portions of the hub to the sleeve 7.

From the foregoing description it will be seen that any one of the segments 16 may be detached from the rest of the hub without removing any other segment. In order to replace a broken spoke, it is only necessary to remove adjoining segments, so as to allow the inner end of the spoke to be introduced laterally instead of radially into the mortises provided therefor in the hub. This of course obviates the necessity for straining the felly or removing a section thereof and renders it practicable to fully repair a wheel as far as the spokes are concerned without disassembling the spokes, felly-sections, and tire.

Having thus described the invention, what is claimed, and desired to be secured by Letters Patent, is—

A sectional wheel-hub, the spoke-receiving portion of which is composed of a stationary section and a removable section, the stationary section being provided with the spoke-receiving mortises, and the remaining section being made up of a circular series of segments, each comprising inner and outer plates offset from each other and lying in different but parallel planes, the adjoining segments overlapping each other, and the overlapping portions thereof being provided with registering openings to receive securing-bolts by means of which the segments are fastened to the stationary section or side of the hub.

In testimony whereof I affix my signature in presence of two witnesses.

GEORGE H. SPRINKLE.

Witnesses:
JOHN H. SKAGGS,
EMMETT F. CECIL.